(12) United States Patent
Urata et al.

(10) Patent No.: US 10,887,636 B2
(45) Date of Patent: Jan. 5, 2021

(54) AV SERVER SYSTEM AND AV SERVER

(71) Applicant: SONY CORPORATION, Tokyo (JP)

(72) Inventors: Kaoru Urata, Kanagawa (JP);
Mamoru Mizukami, Tokyo (JP);
Yasuhiro Ichinaka, Kanagawa (JP);
Akira Itou, Kanagawa (JP); Kenta Abe, Tokyo (JP); Yoshihide Fujimoto, Kanagawa (JP); Takashi Hoshi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/741,312

(22) PCT Filed: Sep. 7, 2016

(86) PCT No.: PCT/JP2016/076236
§ 371 (c)(1),
(2) Date: Jan. 2, 2018

(87) PCT Pub. No.: WO2017/043501
PCT Pub. Date: Mar. 16, 2017

(65) Prior Publication Data
US 2018/0192100 A1 Jul. 5, 2018

(30) Foreign Application Priority Data

Sep. 10, 2015 (JP) .................................. 2015-178213
Jan. 8, 2016 (JP) .................................. 2016-003059

(51) Int. Cl.
*H04N 21/242* (2011.01)
*H04L 29/06* (2006.01)
(Continued)

(52) U.S. Cl.
CPC ......... *H04N 21/242* (2013.01); *H04L 65/601* (2013.01); *H04L 65/607* (2013.01);
(Continued)

(58) Field of Classification Search
None
See application file for complete search history.

(56) References Cited

U.S. PATENT DOCUMENTS 5,991,306 A * 11/1999 Burns ................ H04B 7/18582
370/429
6,744,772 B1 * 6/2004 Eneboe ................. H04L 49/101
370/230
(Continued)

FOREIGN PATENT DOCUMENTS

CN 1993988 A 7/2007
CN 101523888 A 9/2009
(Continued)

OTHER PUBLICATIONS

Toyofuku, et al., "DVCPRO Server", Matsushita Technical Journal, vol. 46, No. 5, Oct. 18, 2000, pp. 54-61.
(Continued)

*Primary Examiner* — An Son P Huynh
(74) *Attorney, Agent, or Firm* — Chip Law Group

(57) ABSTRACT

To increase the number of IO ports and to increase the storage amount easily. An AV server system includes: a plurality of AV servers including internet protocol (IP) input-output ports for connecting to other AV servers, the IP input-output ports being independent from input-output ports to an outside of the system; a client controller configured to control the plurality of AV servers; a manager storing information relevant to AV clip data recorded in the plurality of AV servers and AV clip data input into the plurality of AV servers; and a frame synchronization unit configured to perform frame synchronization between the plurality of AV servers.

17 Claims, 12 Drawing Sheets

(51) Int. Cl.
*H04N 21/25* (2011.01)
*H04N 21/643* (2011.01)
*H04N 21/231* (2011.01)

(52) U.S. Cl.
CPC ......... *H04N 21/231* (2013.01); *H04N 21/25* (2013.01); *H04N 21/64322* (2013.01)

(56) References Cited

U.S. PATENT DOCUMENTS

| | | | |
|---|---|---|---|
| 7,080,400 B1* | 7/2006 | Navar | H04N 7/17336 348/E7.073 |
| 7,100,192 B1* | 8/2006 | Igawa | H04L 29/06027 709/217 |
| 7,113,203 B1* | 9/2006 | Wu | H04N 17/002 348/180 |
| 7,404,201 B2* | 7/2008 | Takeuchi | G06F 17/3089 348/E7.073 |
| 7,673,321 B2* | 3/2010 | Yurt | H04H 20/40 725/114 |
| 7,698,451 B2* | 4/2010 | Ganesan | H04N 7/17336 709/231 |
| 7,761,900 B2* | 7/2010 | Crayford | H04N 7/17318 709/223 |
| 8,166,510 B1* | 4/2012 | Ducharme | H04N 21/23103 725/104 |
| 8,856,846 B2* | 10/2014 | Applegate | H04N 21/2225 725/86 |
| 8,904,463 B2* | 12/2014 | Shankar | H04N 7/17354 725/115 |
| 2002/0021708 A1 | 2/2002 | Ishiai | |
| 2002/0059394 A1* | 5/2002 | Sanders | H04N 7/17336 709/217 |
| 2002/0059623 A1* | 5/2002 | Rodriguez | H04N 5/44543 725/91 |
| 2002/0078174 A1* | 6/2002 | Sim | G06F 17/30194 709/219 |
| 2002/0154892 A1* | 10/2002 | Hoshen | H04N 7/163 386/213 |
| 2003/0033602 A1* | 2/2003 | Gibbs | G11B 27/28 725/46 |
| 2003/0204856 A1* | 10/2003 | Buxton | H04N 7/17318 725/120 |
| 2004/0022222 A1* | 2/2004 | Clisham | H04L 69/18 370/338 |
| 2004/0083128 A1* | 4/2004 | Buckingham | H04L 12/10 709/223 |
| 2004/0119814 A1* | 6/2004 | Clisham | H04N 7/141 348/14.08 |
| 2004/0168052 A1* | 8/2004 | Clisham | H04W 12/001 713/153 |
| 2004/0193677 A1* | 9/2004 | Dar | H04L 29/12113 709/203 |
| 2007/0220024 A1* | 9/2007 | Putterman | H04N 21/43615 |
| 2007/0248313 A1 | 10/2007 | Kageyama | |
| 2007/0274227 A1* | 11/2007 | Rauscher | H04L 43/0858 370/252 |
| 2008/0088858 A1 | 4/2008 | Marcu et al. | |
| 2008/0134258 A1* | 6/2008 | Goose | H04N 7/17336 725/91 |
| 2008/0208041 A1* | 8/2008 | Gilboa | A61B 6/12 600/426 |
| 2009/0066790 A1* | 3/2009 | Hammadou | G08B 13/19636 348/143 |
| 2009/0106807 A1* | 4/2009 | Suzuki | H04N 21/23424 725/114 |
| 2009/0119736 A1* | 5/2009 | Perlman | A63F 13/12 725/133 |
| 2010/0198992 A1* | 8/2010 | Morrison | G06F 16/4393 709/248 |
| 2011/0078717 A1* | 3/2011 | Drummond | H04N 21/4586 725/14 |
| 2011/0239262 A1* | 9/2011 | Yang | H04N 21/26616 725/109 |
| 2012/0089713 A1* | 4/2012 | Carriere | H04L 12/4641 709/222 |
| 2012/0162289 A1* | 6/2012 | Oniki | G09G 3/342 345/690 |
| 2015/0116554 A1 | 4/2015 | Tanaka et al. | |
| 2015/0131991 A1* | 5/2015 | Hattori | H04J 14/0212 398/47 |
| 2016/0234500 A1 | 8/2016 | Tsukagoshi | |

FOREIGN PATENT DOCUMENTS

| | | |
|---|---|---|
| CN | 104429061 A | 3/2015 |
| CN | 105765980 A | 7/2016 |
| EP | 1182873 A2 | 2/2002 |
| EP | 2074814 A1 | 7/2009 |
| EP | 3073740 A1 | 9/2016 |
| JP | 63-128832 A | 6/1988 |
| JP | 10-229420 A | 8/1998 |
| JP | 11-103458 A | 4/1999 |
| JP | 2000-083068 A | 3/2000 |
| JP | 2001-510000 A | 7/2001 |
| JP | 2002-064772 A | 2/2002 |
| JP | 2002-510947 A | 4/2002 |
| JP | 2003-298874 A | 10/2003 |
| JP | 2004-246614 A | 9/2004 |
| JP | 2004-320435 A | 11/2004 |
| JP | 2006-042317 A | 2/2006 |
| JP | 2010-050956 A | 3/2010 |
| JP | 2010-507281 A | 3/2010 |
| JP | 2011-030090 A | 2/2011 |
| JP | 2012-133615 A | 7/2012 |
| JP | 2012-160982 A | 8/2012 |
| JP | 2014-003371 A | 1/2014 |
| JP | 2015-178213 A | 10/2015 |
| JP | 2015-216601 A | 12/2015 |
| WO | 2006/001238 A1 | 1/2006 |
| WO | 2008/048767 A1 | 4/2008 |
| WO | 2014/007279 A1 | 1/2014 |
| WO | 2015/076277 A1 | 5/2015 |

OTHER PUBLICATIONS

International Search Report and Written Opinion of PCT Application No. PCT/JP2016/076236, dated Nov. 31, 2016, 26 pages of translation, and 14 pages of ISRWO.
International Preliminary Report on Patentability of PCT Application No. PCT/JP2016/076236, dated Mar. 13, 2018, 22 pages of translation, and 16 pages of ISRWO.
Toyofuku, et al, "DVCPRO server", Matsushita Technical Journal, vol. 46, No. 5, Oct. 2000, pp. 54-61 (Translation of abstract only).
Office Action for JP Patent Application No. 2016-003059, dated Mar. 3, 2020, 20 pages of Office Action and 18 pages of English Translation.
Office Action for JP Patent Application No. 2016-003059, dated Jun. 30, 2020, 9 pages of Office Action and 8 pages of English Translation.
Taira, et al., "Revised Second Edition, CentOS Server Construction Bible", First Edition, Mainichi Communications Inc., Sep. 30, 2009, pp. 291-294.
"Separate Volume DTPWORLD, Illustrated Color Management Practice Rulebook 2005-2006", Edited by MD Study Group and DTPWORLD Editorial Department, Works Corporation Co., Ltd., Aug. 26, 2005, p. 62.
Yoshihiro Enatsu, "Ultra-Comfortable Workflow Aimed at Adobe CS 5.5 [Last Round] Native Editing of Red Epic", Video α, Dec. 2011, vol. 27, No. 12, Photographic Industrial Publisher, Dec. 1, 2011, pp. 123-127.

* cited by examiner

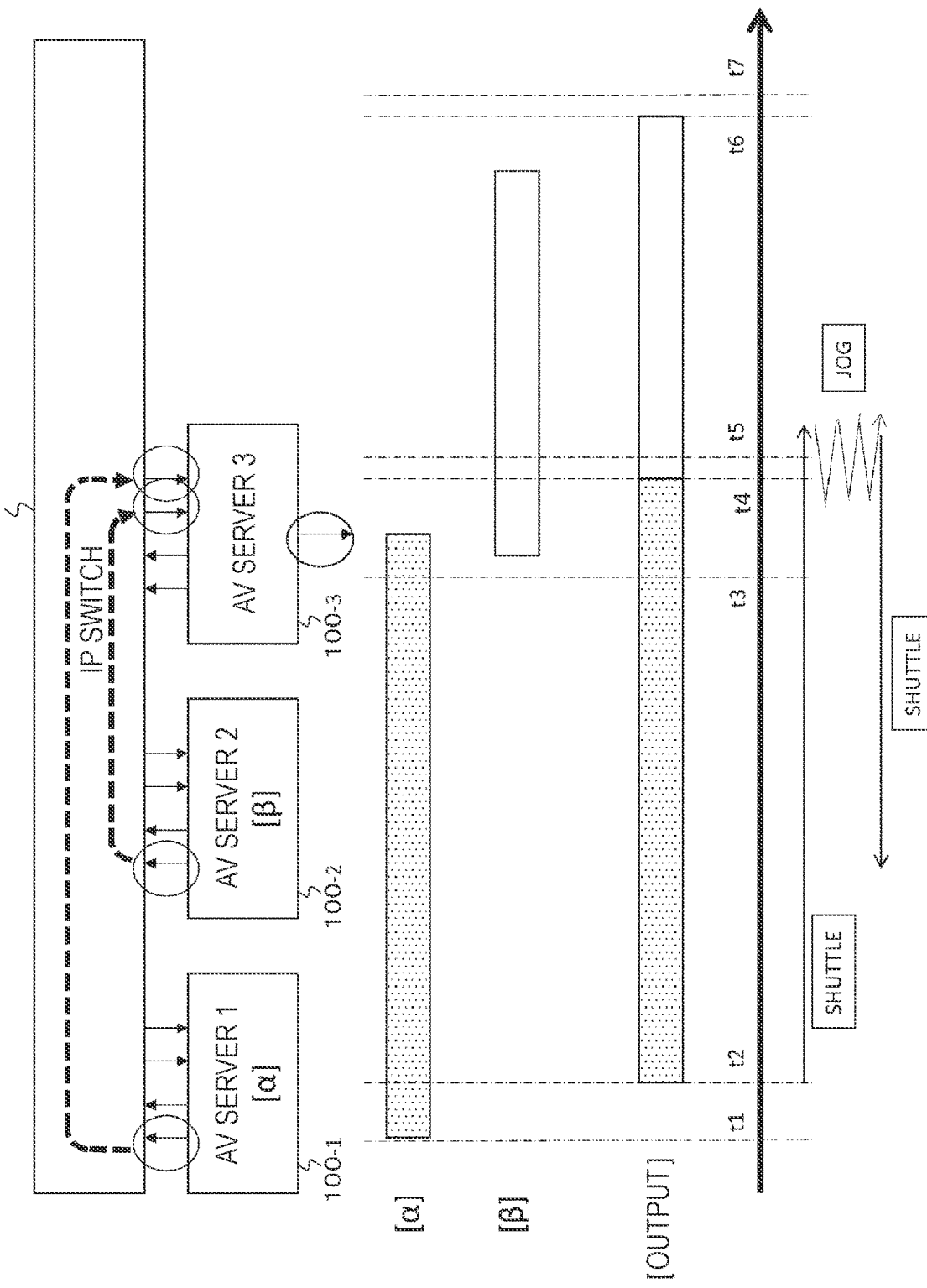

AV SERVER SYSTEM AND AV SERVER

CROSS REFERENCE TO RELATED APPLICATIONS

This application is a U.S. National Phase of International Patent Application No. PCT/JP2016/076236 filed on Sep. 7, 2016, which claims priority benefit of Japanese Patent Application No. JP 2015-178213 filed in the Japan Patent Office on Sep. 10, 2015 and also claims priority benefit of Japanese Patent Application No. JP 2016-003059 filed in the Japan Patent Office on Jan. 8, 2016. Each of the above-referenced applications is hereby incorporated herein by reference in its entirety.

TECHNICAL FIELD

The present technology relates to an AV server system and an AV server, and particularly relates to an AV server system or the like in which a plurality of AV servers are connected via a network.

BACKGROUND ART

For example, Patent Literature 1 describes a technology that increases the number of IO ports of an AV server. Here, the number of IO ports is increased by separating an AV storage unit from input-output devices and increasing only the number of input-output devices.

CITATION LIST

Patent Literature

Patent Literature 1: JP 2005-063122A

DISCLOSURE OF INVENTION

Technical Problem

A purpose of the present technology is to make it easy to increase the number of IO ports and to increase the storage amount.

Solution to Problem

A concept of the present technology is an AV server system including: a plurality of AV servers including internet protocol (IP) input-output ports for connecting to other AV servers, the IP input-output ports being independent from input-output ports to an outside of the system; a client controller configured to control the plurality of AV servers; a manager storing information relevant to AV clip data recorded in the plurality of AV servers and AV clip data input into the plurality of AV servers; and a frame synchronization unit configured to perform frame synchronization between the plurality of AV servers.

The AV server system in the present technology includes a plurality of AV servers, a client controller, a manager, and a frame synchronization unit. The AV server includes an IP input-output port for connecting to another AV server, which is independent from an input-output port to an outside of the system. The plurality of AV servers use IP input-output ports, and are connected to each other via an IP network (IP switch). The frame synchronization unit performs frame synchronization between the plurality of AV servers.

The AV server is controlled by the client controller. The manager stores information relevant to AV clip data recorded in the plurality of AV servers and AV clip data input into the plurality of AV servers. The client controller can recognize the content of the AV clips in each AV server on the basis of the stored information of the manager, and controls the AV servers on the basis of the recognized content.

For example, the AV server may output compressed AV clip data of a predetermined number of frames at a predetermined number of frame cycles from the IP input-output port. In addition, for example, the AV server may output compressed AV clip data of one frame at one frame cycle from the IP input-output port.

In addition, for example, the AV server may process compressed AV clip data input into the IP input-output port at a predetermined number of frame cycles, as compressed AV clip data of a predetermined number of frames. In addition, for example, the AV server may process compressed AV clip data input into the IP input-output port at one frame cycle, as compressed AV clip data of one frame.

In addition, for example, the AV server may process compressed AV clip data input into the IP input-output port during a period of shorter than one frame from a frame start time, as compressed AV clip data of one frame. In this case, for example, the AV server may reproduce deficient compressed AV clip data from the input compressed AV clip data by forward error correction.

In addition, for example, the AV server may output compressed AV clip data corresponding to normal video data or compressed AV clip data corresponding to raw data obtained by a single-chip camera, to the IP input-output port. In this case, for example, metadata for a demosaic process may be appended to the compressed AV clip data corresponding to the raw data.

In addition, for example, the AV server may include a decoding unit configured to perform a decoding process to compressed AV clip data input into the IP input-output port to obtain uncompressed AV clip data, and a delay time in the decoding unit may be constant, regardless of a compressed data format of the input compressed AV clip data. In addition, for example, the AV server may be capable of arbitrarily changing a number of input ports and a number of output ports, among a total number of the IP input-output ports.

As described above, in the present technology, the plurality of AV servers are connected via the IP network, and it is possible to easily increase the number of IO ports and increase the storage amount.

In addition, in the present technology, for example, the AV server may include a storage configured to record compressed AV clip data, and a first record unit configured to record, in the storage, first AV clip data obtained by performing a compression encoding process to raw data of a high frame rate input from a single-chip camera, with metadata for performing a demosaic process appended. For example, a high frame rate may be set to 120P or more. By recording the raw data input from the single-chip camera in the storage without performing a demosaic process as described above, the raw data of the high frame rate can be recorded in the storage smoothly, and the freedom degree of processing, such as gradation and coloring, can be ensured.

In this case, the AV server may further include a second record unit configured to record, in the storage, second AV clip data obtained by converting the high frame rate input from the single-chip camera to raw data of a normal frame rate and then performing the demosaic process to obtain normal video data of a normal frame rate, and performing a compression encoding process to the normal video data. This normal video data of the normal frame rate is used highly frequently, and the load on the system becomes smaller by recording the normal video data in the storage in advance.

Advantageous Effects of Invention

The present technology can easily increase the number of IO ports and increase the storage amount. Note that the effects described in the present specification are just examples and are not limitative, and there may be additional effects.

BRIEF DESCRIPTION OF DRAWINGS

FIG. 12 is a diagram for describing an example of playlist replay.

MODE(S) FOR CARRYING OUT THE INVENTION

In the following, a mode for carrying out the invention (in the following, "embodiment") will be described. Note that the description will be made in the following order.
1. Embodiment
2. Variant Example 1. Embodiment

Figure 1:
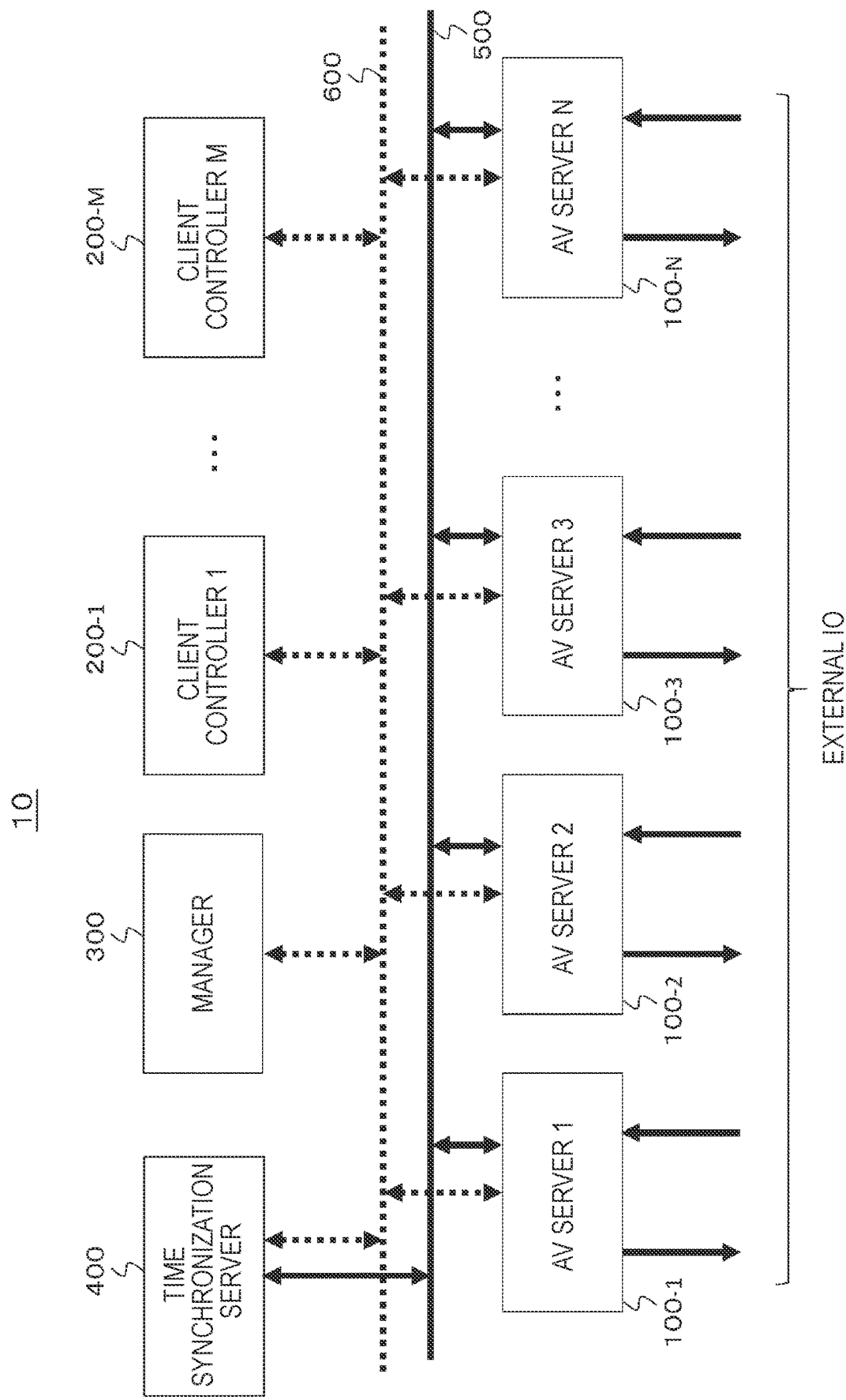
FIG. 1 is a block diagram illustrating a configuration example of an AV server system as an embodiment.
Figure 2:
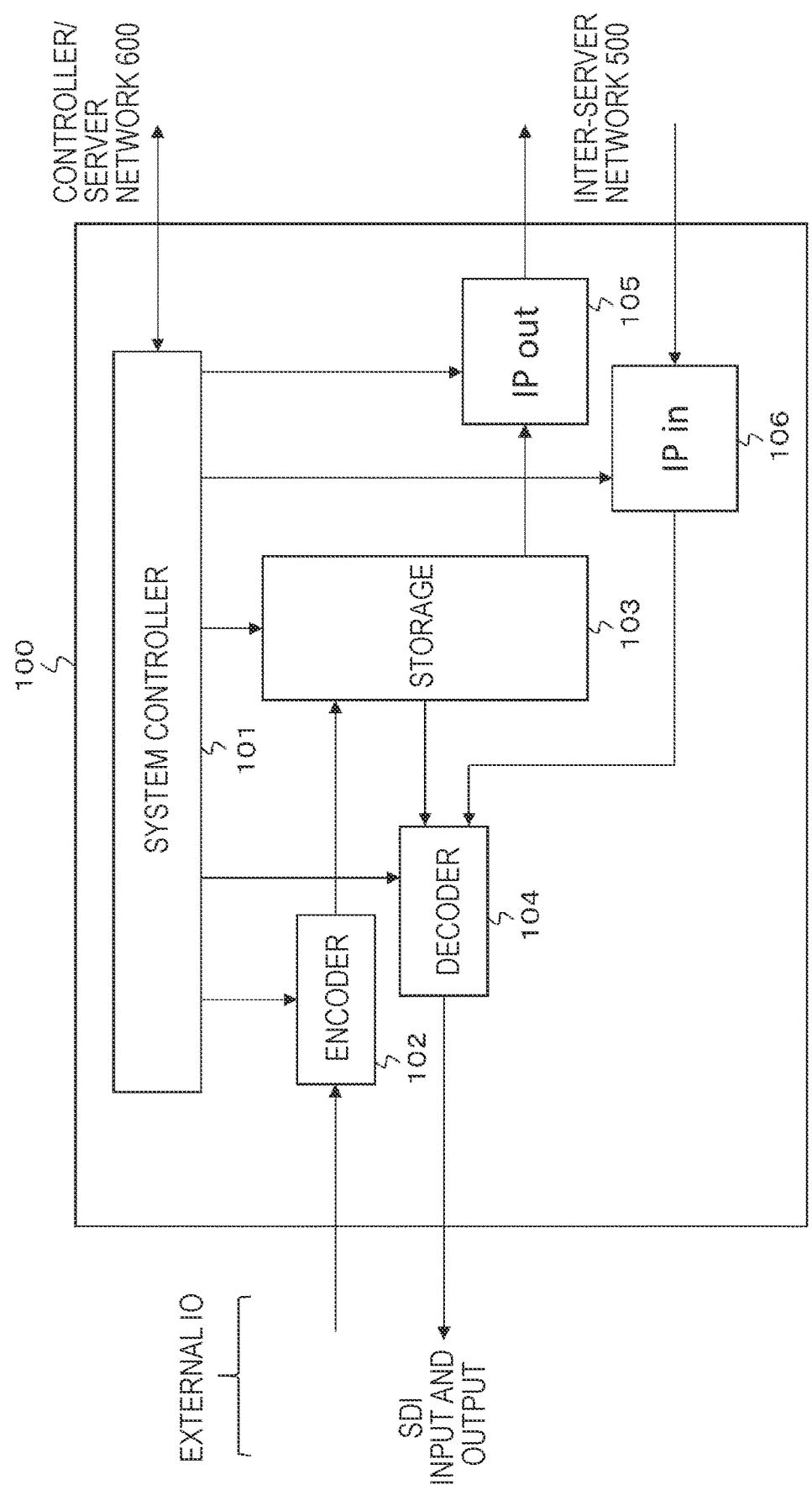
FIG. 2 is a block diagram illustrating a configuration example of an AV server.

[Configuration Example of AV Server System]
FIG. 1 illustrates a configuration example of an AV server system 10 as an embodiment. This AV server system 10 includes N (N is more than one) AV servers 100-1, 100-2, . . . , 100-N, M client controllers 200-1, 200-2, . . . , 200-N, a manager 300, and a time synchronization server 400. Note that M is the same as N normally, but may be different from N.
The AV server 100-1, 100-2, . . . , 100-N includes an input-output port (external IO) to the outside of the system, and includes an internet protocol (IP) input-output port for connecting to another AV server. The AV server 100-1, 100-2, . . . , 100-N is connected to a dedicated IP network (hereinafter, referred to as "inter-server network" as appropriate) 500 by utilizing the IP input-output port.
The client controllers 200-1, 200-2, . . . , 200-M control the AV servers 100-1, 100-2, . . . , 100-N on the basis of operation of an operator. Each of the client controllers 200-1, 200-2, . . . , 200-M is connected to the AV servers 100-1, 100-2, . . . , 100-N via a controller/server network 600.
The client controllers 200-1, 200-2, . . . , 200-M are used to perform a task, such as recognition of the AV clip data stored or input in each AV server, replay request, jog/shuttle/variable-speed replay operation, and playlist editing, for example.
The manager 300 performs database management (DB management) of the AV clip data stored or input in the entire system, management of band guarantee for data transmission, and management of a utilization situation of each AV server. This manager 300 is connected to the AV servers 100-1, 100-2, . . . , 100-N, and the client controllers 200-1, 200-2, . . . , 200-M via the controller/server network 600.
The time synchronization server 400 is connected to the AV servers 100-1, 100-2, . . . , 100-N, and the client controllers 200-1, 200-2, . . . , 200-M, via the controller/server network 600. Also, the time synchronization server 400 is connected to the AV servers 100-1, 100-2, . . . , 100-N, via the inter-server network 500.
The time synchronization server 400 synchronizes the times of the AV servers 100-1, 100-2, . . . , 100-N within a predetermined error range, by operating as a master according to IEEE1588, JP 2010-190653A, or JP 2010-197320A. In this meaning, the time synchronization server 400 configures a frame synchronization unit that performs frame synchronization of each AV server.
Note that the frame synchronization of each AV server can be performed also by using a house sync supplied to a location where each AV server is installed. The house sync is a frame signal that is supplied to everywhere in a broadcast station or the like, for the purpose of causing devices in the broadcast station to achieve frame synchronization.
Also, the time synchronization server 400 measures a transmission delay amount between arbitrary nodes, by internode transmission delay measurement which is performed periodically. Considering the response of jog/shuttle, it is desirable that the internode transmission delay amount is suppressed to one frame or less. Also, the internode data transmission delay amount measurement by the time synchronization server 400 is unnecessary, if the system is built under a premise that the internode transmission delay amount is suppressed to one frame or less. Also, if the internode data transmission delay amount measurement is unnecessary as described above, and additionally the frame synchronization of each AV server is performed by the input of the house sync, the time synchronization server 400 is unnecessary.
Data transmission is mainly performed through the inter-server network 500 to which the AV servers 100-1, 100-2, . . . , 100-N are connected, and command transmission, information transmission of the AV clip data stored or input in each AV server, and the like are performed through the controller/server network 600 to which the AV servers 100-1, 100-2, . . . , 100-N, the client controllers 200-1, 200-2, . . . , 200-M, and the manager 300 are connected.
FIG. 2 illustrates a configuration example of an AV server 100 that can be used as the AV servers 100-1, 100-2, . . . , 100-N. This AV server 100 includes an input-output IO (external IO) to the outside of the AV server system 10. The illustrated example illustrates only SDI input and output as the external IO, but IP input and output, HDMI input and output, or other various IOs may coexist. Note that "HDMI" is a registered trademark.

Also, the AV server 100 includes a system controller 101, an encoder 102, a storage 103, a decoder 104, an IP output unit 105, and an IP input unit 106. The system controller 101 controls the operation of each unit of the AV server 100. This system controller 101 is connected to the controller/server network 600.

The IP output unit 105 configures an IP output port for connecting to the inter-server network 500. The IP input unit 106 configures an IP input port for connecting to the inter-server network 500. The encoder 102 generates compressed AV clip data by performing an encoding process with a predetermined codec to the AV clip data input into the external IO. The storage 103 stores the compressed AV clip data obtained by the encoder 102. The decoder 104 generates uncompressed AV clip data by performing a decoding process to the compressed AV clip data read out from the storage 103 or input into the IP input unit 106 from another AV server, and outputs the uncompressed AV clip data to the external IO.

Figure 3:
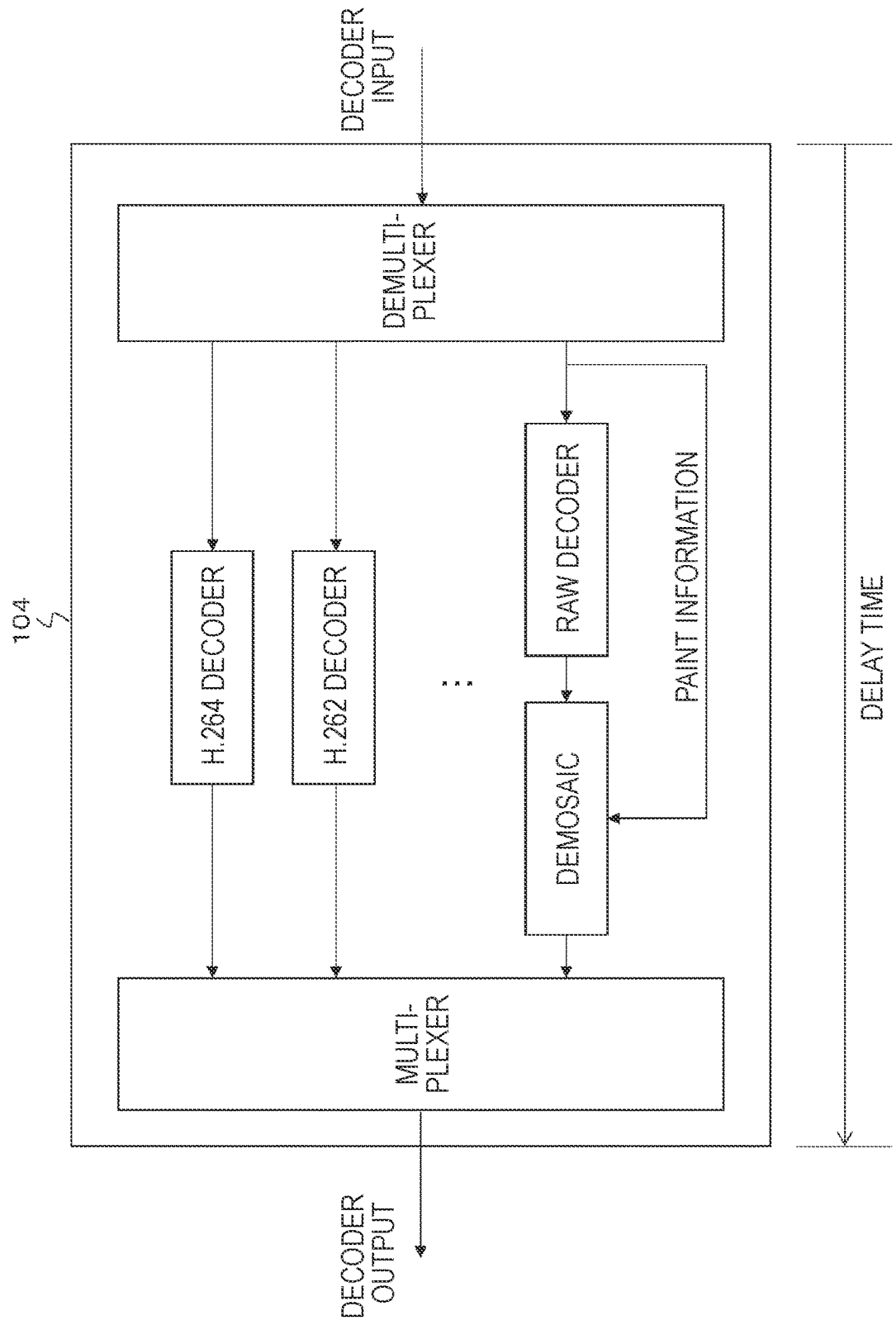
FIG. 3 is a block diagram illustrating a configuration example of a decoder.

FIG. 3 illustrates a configuration example of the decoder 104. The decoder 104 includes a plurality of types of decoders, such as an H.264 decoder and an H.262 decoder, in order to enable decoding of various codecs. Note that decoding of compressed raw data obtained by compressing raw data obtained by capturing an image by a single-chip camera is also enabled. The utilized decoder is selected by a demultiplexer and a multiplexer. In decoding of the compressed raw data, a demosaic process is performed to the data after decoding, and is set as a decoder output of normal video data. Note that, at the time of the demosaic process, a process such as gamma correction and white balance adjustment is performed by paint information appended to the compressed raw data. Although detailed description is omitted, the encoder 102 includes a plurality of types of encoders, similarly to the decoder 104.

The operation of the single component will be described. The AV clip data input into the external IO is supplied to the encoder 102. In the encoder 102, the encoding process is performed to compress the AV clip data, in order to generate the compressed AV clip data. This compressed AV clip data is stored in the storage 103.

Also, the compressed AV clip data stored in the storage 103 is read out from the storage 103 in accordance with a replay request, and is supplied to the decoder 104. In the decoder 104, the decoding process corresponding to the codec is performed to decompress the compressed AV clip data, in order to generate the AV clip data. This AV clip data is output from the external IO. In a jog/shuttle of a 60P system, the AV clip data of 60 frames per one second is subjected to a process such as decimation according to a commanded speed at the time of readout from the storage 103 for example, and is output from the external IO.

The operation (file sharing operation) with another AV server will be described. The compressed AV clip data stored in the storage 103 is read out from the storage 103 in accordance with a replay request from another AV server, and is output to the inter-server network 500 from the IP output unit (IP output port) 105, and is transmitted to the other AV server. In the jog/shuttle of the 60P system, the AV clip data of 60 frames per one second is subjected to the process such as the decimation according to the commanded speed at the time of the readout from the storage 103, and is transmitted to the other AV server.

Also, the compressed AV clip data input into the IP input unit (IP input port) 106 from another AV server via the inter-server network 500 is supplied to the decoder 104. In the jog/shuttle of the 60P system, the AV clip data of 60 frames per one second is subjected to the process such as the decimation according to the commanded speed, and is transmitted from another AV server. In the decoder 104, the decoding process corresponding to the codec is performed to decompress the compressed AV clip data, in order to generate the AV clip data. This AV clip data is output to the external IO.

Figure 4:
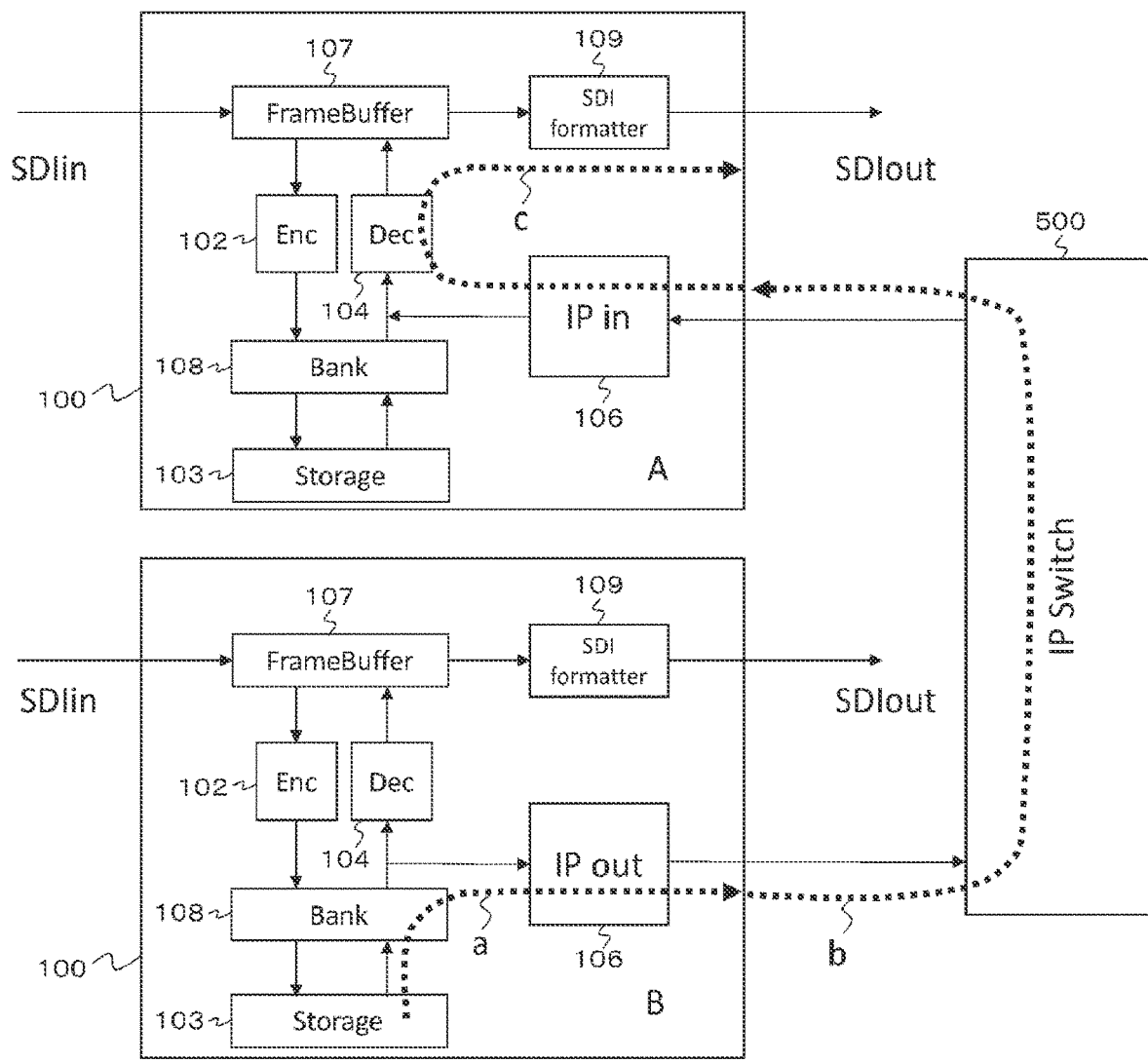
FIG. 4 is a diagram for describing a data flow in a case in which data is transmitted between AV servers.

FIG. 4 illustrates a data flow with a dashed line in a case in which data is transmitted from the AV server 100 indicated by "B" to the AV server 100 indicated by "A". Although not illustrated in the configuration example of the AV server 100 illustrated in FIG. 2, a frame buffer 107 exists at the prior stage of the encoder 102 and the subsequent stage of the decoder 104, that is, between the external IO, and the encoder 102 and the decoder 104, actually. Also, a bank 108 exists between the storage 103, and the encoder 102 and the decoder 104. Also, an output interface for outputting the AV clip data in a predetermined interface format, which is a SDI formatter 109 in the illustrated example, exists at the subsequent stage of the frame buffer 107.

In the operation of the single component, both of the AV servers 100 indicated by "A" and "B" perform the operation below. At the time of storage, the AV clip data is input into SDIin, and is compressed by the encoder 102 via the frame buffer 107, and is stored in the storage 103 via the bank 108. At the time of replay, the data is read out to the bank 108 from the storage 103, and is decompressed by the decoder 104, and thereafter is output to SDIout via the frame buffer 107. Note that urgent replay operation is returned by the bank 108, or is returned by the frame buffer 107, so that what is called "tottedashi (replay without editing)" is performed.

At the time of file share replay, the compressed AV clip data read out from the storage 103 of the AV server 100 indicated by "B" is read out to the bank 108, and is output to the inter-server network (IP switch) 500 through the IP output unit (IP output port) 105. Then, the compressed AV clip data is input into the IP input unit (IP input port) 105 of the AV server 100 indicated by "A" from the inter-server network (IP switch) 500, and is decompressed by the decoder 104, and thereafter is output to SDIout via the frame buffer 107. It is not different from the above replay in the operation of the single component, except for the inter-server network 500 interposed. Thus, the operation of jog/shuttle/variable-speed replay is basically not different from the operation of the single component, and the difference is only the inter-server network 500 interposed.

In the file share replay, the AV clip data passes through a route in the order of a, b, c. The transmission delay amounts of a and c are predetermined values, whereas the transmission delay amount of b is a different value depending on the configuration of the inter-server network 500, the distance on the network between the AV servers 100 indicated by "A" and "B", and the traffic on the inter-server network in some cases.

The time synchronization server 400 measures the transmission delay amount between the nodes periodically, and thereby it is possible to find how much time before the readout of the compressed clip data from the storage 103 must be started in order to output the data at a predetermined time, and informs that it is impossible to output the compressed clip data at a predetermined time in some cases. Note that, if the system configuration is such that the transmission delay amount between the nodes is set in advance within a predetermined value, for example within one frame, as described above, the transmission delay amount measurement by the time synchronization server 400 is unnecessary.

As described above, the data transmission delay relevant to the file share replay straddling between arbitrary nodes is decided by the predetermined transmission delay amounts of the routes a and c in the AV server 100 and the transmission delay amount of the route b measured by the time synchronization server 400, in order to set the readout time from the storage 103 for outputting the AV clip data to the outside of the system at a correct time.

The AV server 100 supports various picture frames and various codecs. In this embodiment, the transmission delay amount of the route c is set to a constant value for all supported picture frames and codecs. For example, the decoder 104 is configured in such a manner that the delay time (refer to FIG. 3) from the decoder input to the decoder output is constant for all the codecs. In the case of a codec in which the decoding process is completed in a short time, this is achieved by delaying the output.

Also, the data route for outputting, not the compressed AV clip data stored in the storage 103 of the AV server 100, but the compressed AV clip data being recorded in the storage at the present moment, from another AV server by file sharing is a route of SDIin→the frame buffer 107→the encoder 102→the bank 108→the IP output unit (IP output port) 105→the inter-server network (IP switch) 500, in the AV server 100 indicated by "B" of FIG. 4.

Figure 5:
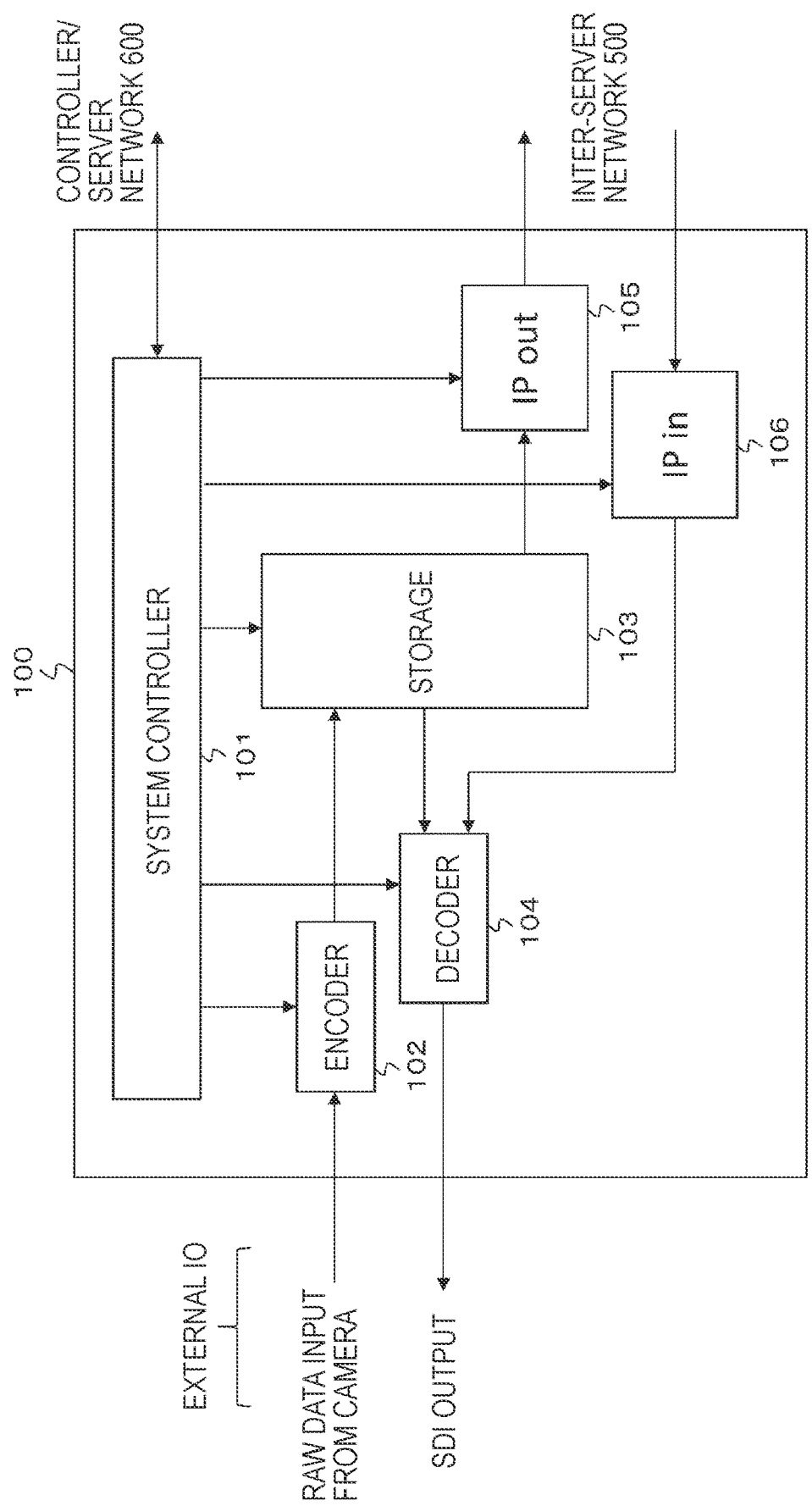
FIG. 5 is a block diagram illustrating a special configuration example of an AV server.

FIG. 5 illustrates a special configuration example of the AV server 100. In this FIG. 5, the parts corresponding to FIG. 2 are denoted with the same reference signs, and their detailed description will be omitted as appropriate. This AV server 100 is a baseband processor unit (BPU) connected to the subsequent stage of a system camera. The BPU is normally used to convert the raw data obtained by the single-chip camera to the normal video data by performing demosaic to the raw data, and to perform slow replay by storing high-speed captured image data obtained by a high frame rate (HFR) camera. Note that return video input for system camera operation is omitted in the drawing. Note that, if a three-chip camera is connected, the AV clip data input from the outside is normal video data, and therefore the operation is the same as that of the AV server 100 of FIG. 2.

When the raw data obtained by the single-chip camera is input, this raw data is subjected to the encoding process by the encoder 102 to be compressed, and thereafter is stored (recorded) in the storage 103 as the compressed AV clip data. Without the demosaic, the raw data does not become normal video data, and therefore the decoder 104 performs the demosaic in addition to the decompression by the decoding process. This decoder 104 in the AV server 100 as the BPU of FIG. 5 is configured similarly to the decoder 104 in the AV server 100 of FIG. 2 (refer to FIG. 3).

The single-chip camera is used in filming movies or dramas in many cases. In that case, a specialist of picture creation such as coloring takes time to create the video signal at the same time of demosaic, and thus metadata relevant to the demosaic is not needed necessarily. However, automatic demosaic is performed in this embodiment, and thus appropriate paint information (metadata) is necessary in addition to the raw data. Thus, the raw data input from the camera is compressed by the encoder 102, and thereafter the paint information is appended to the compressed raw data and is stored in the storage 103. Note that this paint information is the information for performing a process such as gamma correction and white balance adjustment, and is supplied from the camera.

When the compressed raw data is read out from the storage 103, the paint information appended thereto is also read out simultaneously, and in the case of the operation of single component, is sent to the decoder 104 of itself, and in the case of the share replay operation, is sent to the decoder 104 of another AV server 100 via the inter-server network 500. Then, the decoder 104 performs the demosaic in addition to the decompression by the decoding process, and further performs a process such as gamma correction and white balance adjustment on the basis of the paint information.

Figure 6:
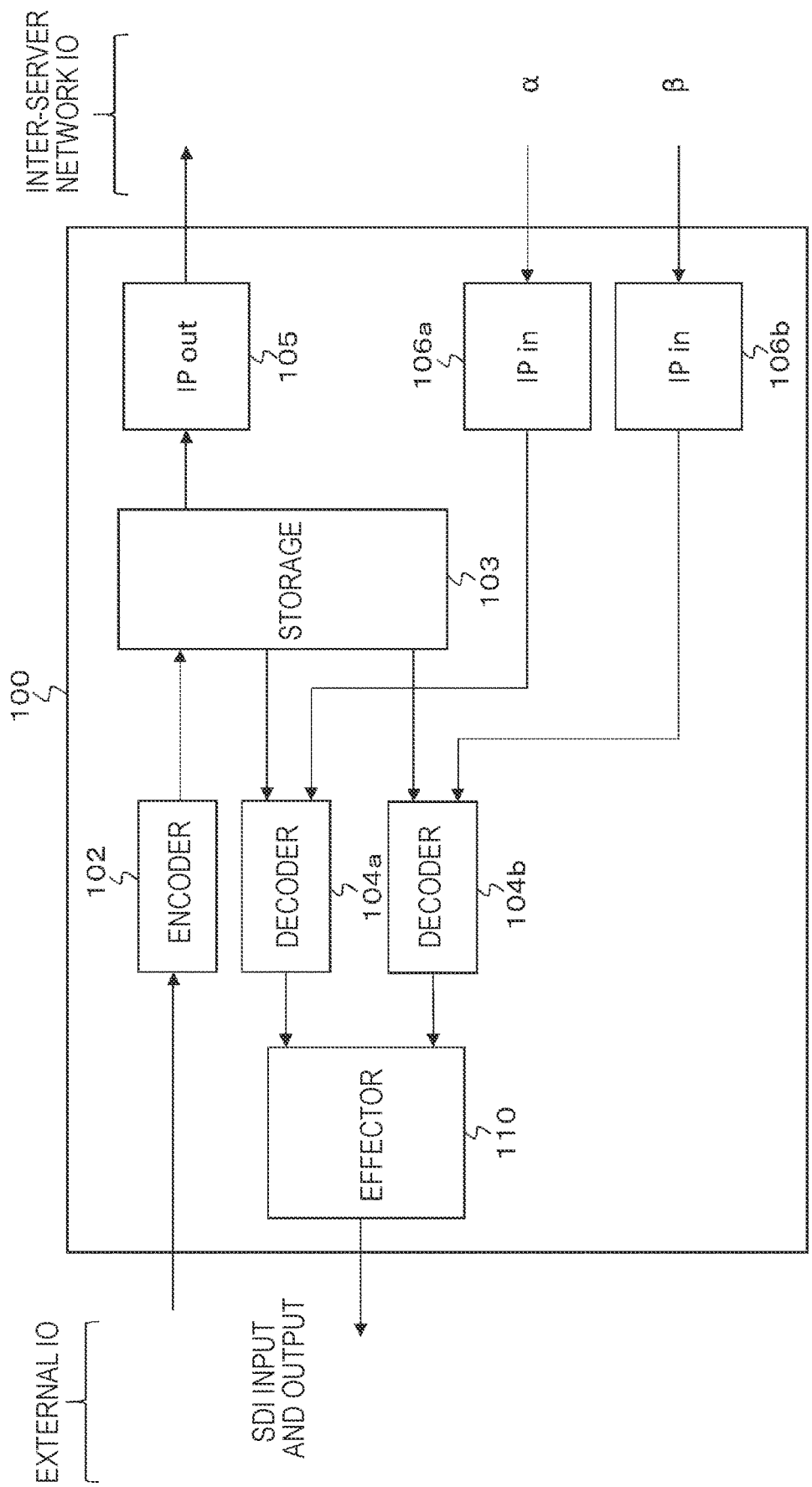
FIG. 6 is a block diagram illustrating a configuration example of an AV server for performing clip connection at the time of playlist replay.

FIG. 6 illustrates a configuration example of the AV server 100 for performing clip connection at the time of playlist replay. In this FIG. 6, the parts corresponding to FIG. 2 are denoted with the same reference signs, and their detailed description will be omitted. In the illustrated example, two decoders 104*a*, 104*b*, two IP input units (IP input ports) 106*a*, 106*b*, and an effector 110 are included. Note that, in this FIG. 6, illustration of the system controller 101 is omitted.

The playlist replay is the replay that performs replay in accordance with a playlist that describes an edit procedure for performing cut editing and applying effect. It is necessary to switch the AV clip data by combining simple replays to appropriately perform switching or apply effect on the AV server 100 that performs external output.

At a clip connection, the compressed AV clip data before and after the connection is read out from the storage 103 of a predetermined AV server 100 that stores the compressed AV clip data at appropriate timings respectively, and both are input into the AV server 100 whose output port is designated via the inter-server network 500, and are subjected to switching/effect application by the effector 110 after the decoding in the AV server 100.

In the example of FIG. 6, a configuration that performs switching from AV clip data α to AV clip data β is illustrated. Two IP input units (IP input ports) 106*a*, 106*b* are provided for the inter-server network 500, and the transmission of the inter-server network 500 is performed to input the AV clip data α, β respectively. Then, the decoders 104*a*, 104*b* perform the decoding process to the AV clip data α, β respectively, and thereafter the effector 110 performs the switching appropriately.

Note that this paint information is white balance setting information, white balance offset setting information, black setting information, flare correction setting information, gain setting information, electronic shutter operating condition setting information, slow shutter setting information, iris control setting information, slow & quick motion setting information, flicker correction setting information, gamma correction setting information, black gamma setting information, knee correction setting information, white clip setting information, detail adjustment setting information, aperture correction setting information, skin detail correction setting information, matrix correction installation information, multi-matrix correction setting information, and the like, and is supplied from the camera, and is appended to the raw data and stored in the storage 103.

"Slow Replay"

A case in which a high frame rate (HFR) camera is connected to the BPU (refer to the AV server 100 of FIG. 5) will be described. The HFR camera is a camera that is capable of capturing an image in a higher frame rate than a normal frame rate, that is, a high frame rate. For example, when the normal frame rate is 60P (capturing 60 frames per one second), the high frame rate is equal to or higher than 120P. The slow replay is enabled by reading out the frame data captured at a high speed by the HFR camera, at a normal frame rate. For example, if the data captured at 480P is read out at the rate of 60P, slow replay is performed at ⅛ speed.

Figure 7:
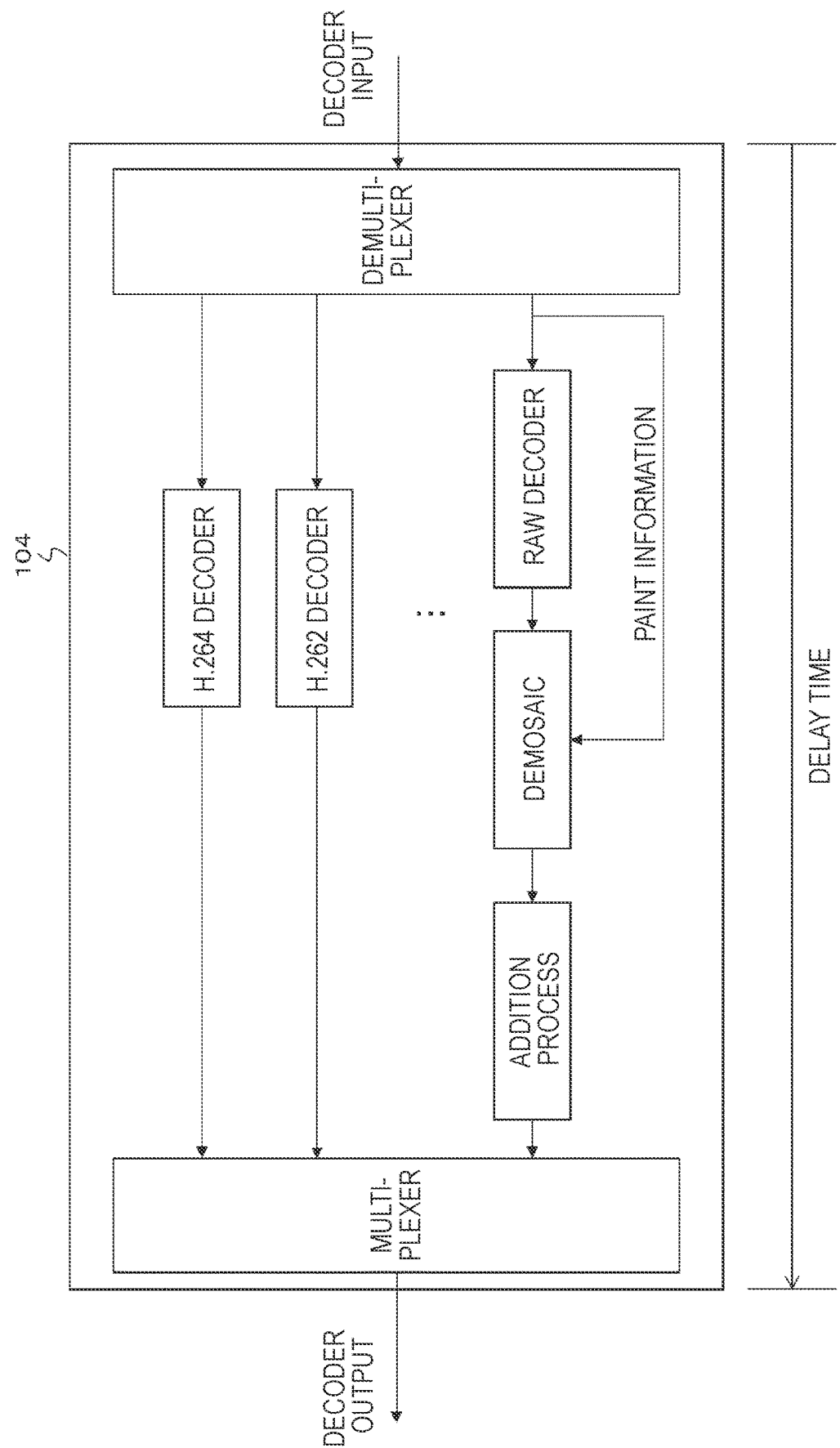
FIG. 7 is a block diagram illustrating another configuration example of a decoder.

If the data captured at n×60P is output at 60P, slow replay is performed at 1/n speed, and if consecutive k frames are added at the time of the replay, and the result is multiplied by 1/k and output at 60p, slow replay is performed at k/n speed. FIG. 7 illustrates a configuration example of the decoder 104 that includes an addition processing unit that adds consecutive k frames and multiplies the result by 1/k. In this case, slow replay is enabled in various rates, with n at the time of image capturing and k at the time of replay.

There is a method that does not perform this addition process but performs decimation such as replaying and outputting one frame in every k frames to perform k/n speed replay, and in that case the load of the inter-server network becomes lighter. However, the motion of the replay output becomes smoother by sending all the consecutive frames and performing the addition process.

Figure 8:
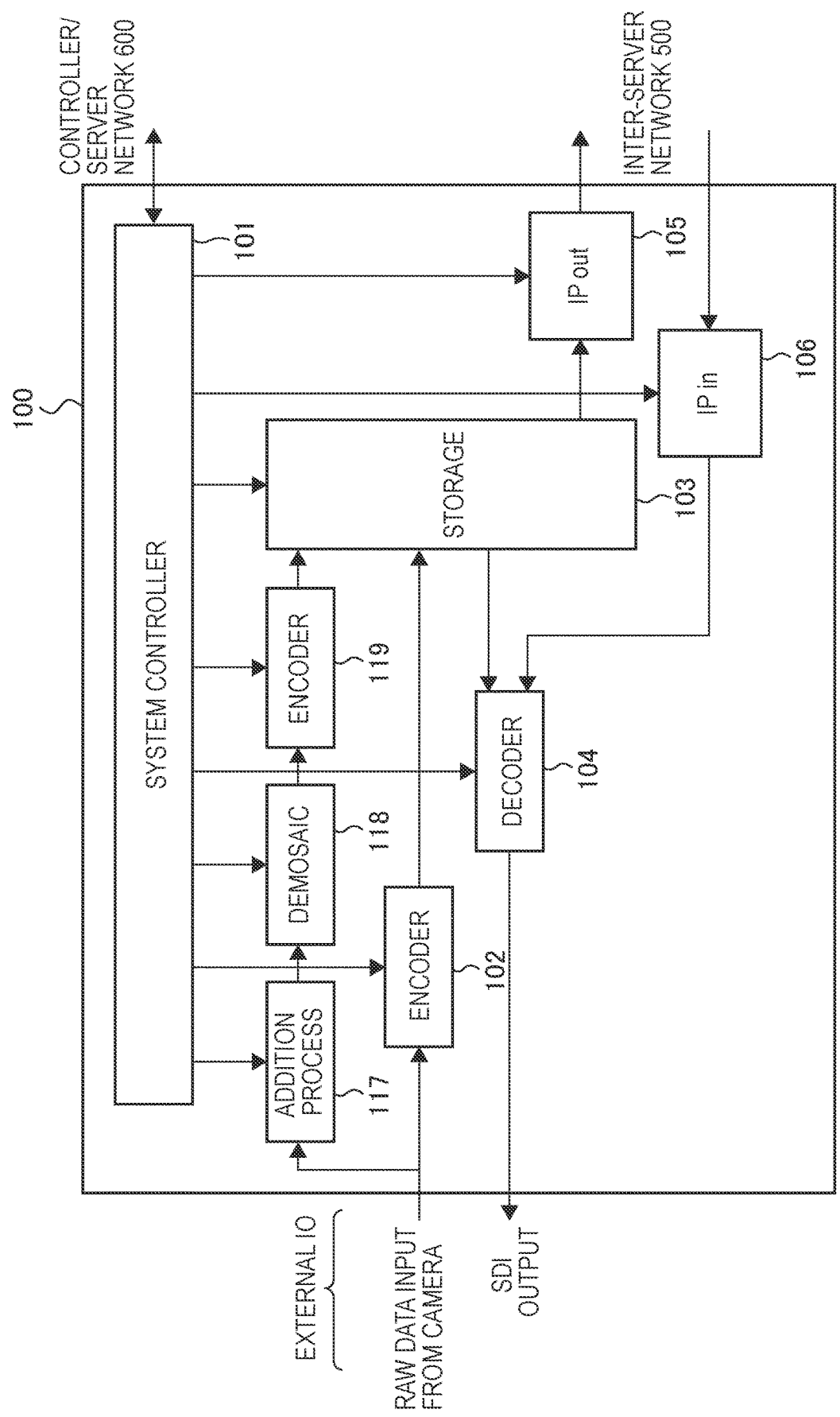
FIG. 8 is a block diagram illustrating another configuration example of an AV server.

Also, when the HFR camera captures images at a high speed, data usability is improved by recording also the data of normal frame rate. FIG. 8 illustrates a configuration example of the AV server 100 in that case. In this FIG. 8, the parts corresponding to FIG. 5 are denoted with the same reference signs, and their detailed description will be omitted as appropriate.

The encoder 102 performs the encoding process (compression encoding process) to the raw data of a high frame rate of N times speed input from the single-chip camera, in order to obtain the compressed raw data, and the paint information is appended to this compressed raw data and is stored (recorded) in the storage 103 as the compressed AV clip data (first AV clip data). By recording the raw data input from the single-chip camera, in the storage 103 without performing the demosaic process as described above, the raw data of the high frame rate of N times speed can be smoothly recorded in the storage 103, and the freedom degree of processing, such as gradation and coloring, can be ensured.

Also, an addition processing unit 117 adds consecutive N frames to the raw data of the high frame rate of N times speed input from the single-chip camera, and further the result is multiplied by 1/N in order to obtain the raw data of the normal frame rate of 1× speed. The demosaic unit 118 performs the demosaic process to the raw data of this normal frame rate, to obtain the normal video data (1× speed video data) of the normal frame rate.

The encoder 119 performs the encoding process (compression encoding process) to the normal video data of this normal frame rate in order to obtain compressed normal video data, and this compressed normal video data is stored (recorded) in the storage 103 as the compressed AV clip data (second AV clip data). Thereby, the raw data of the high frame rate, as well as the normal video data which looks as if captured at the normal frame rate, is stored in the storage 103. The normal video data of this normal frame rate is used highly frequently, and the load on the system becomes smaller by recording the normal video data in the storage 103 in advance.

In the case of sports video or the like, a cut is requested in many cases to perform replay at 1× speed and then to perform slow replay from a certain time point, and this is achieved by a method for switching between two compressed AV clips with synchronization, such as replaying 1× speed video data and the raw data recorded at N times speed by switching them at a certain time point. For example, this is achieved by inputting 1× speed video data as the clip data α and N times speed raw data as the clip data β in the AV server illustrated in FIG. 6 and switching them at the same image capturing time.

Note that, instead of the compressed 1× speed video data described above, it is conceived to add the consecutive N frames, multiply the result by 1/N to create 1× speed raw data, store its compressed data in the storage 103 together with the paint information, and utilizes it.

Figure 9:
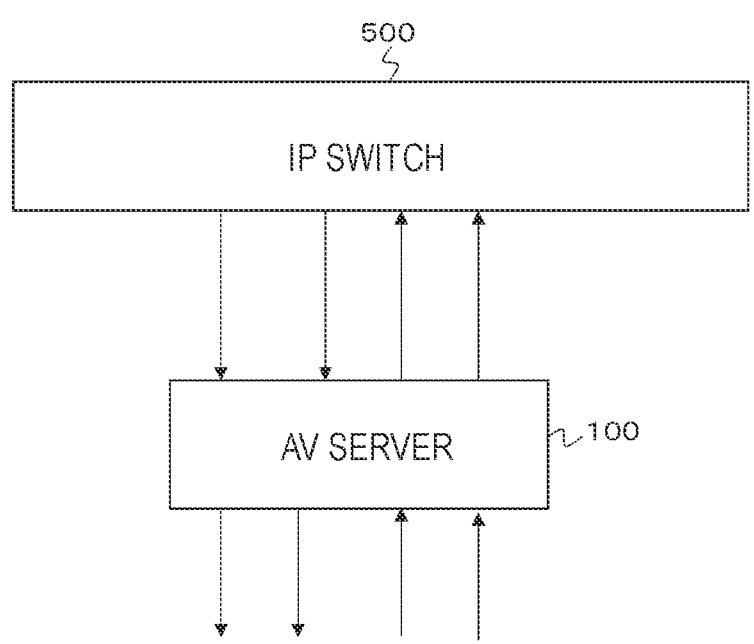
FIG. 9 is a diagram illustrating connection between an AV server and an IP switch for configuring an inter-server network.

FIG. 9 illustrates connection between the AV server 100 and the IP switch that configures the inter-server network 500. In the illustrated example, one AV server 100 is connected to the inter-server network 500 through four IO ports including two inputs and two outputs. Also, in the illustrated example, the input-output IOs to the outside of the system are four in total, including two inputs and two outputs.

Here, the AV server 100 outputs the compressed AV clip data of a predetermined number of frames at a predetermined number of frame cycles, i.e. in this embodiment one frame at one frame cycle, from one IP output port. Also, the AV server 100 processes the compressed AV clip data input into one IP input port at a predetermined number of frame cycles as the compressed AV clip data of a predetermined number of frames, i.e. in this embodiment processes the compressed AV clip data input at one frame cycle as the compressed AV clip data of one frame. Thereby, it becomes easy to manage the band in the inter-server network 500 of the AV server system 10, facilitating the implementation.

In this case, the AV server 100 processes the compressed AV clip data input during a period of one frame or less, for example a period of 0.5 frames, from a frame start time, as the compressed AV clip data of one frame. This improves the response of the jog/shuttle. Note that, in this case, the response can be improved as the period is made shorter, but the number of unreceived IP kets increases accordingly. The compressed AV clip data that is deficient due to the unreceived IP kets is reproduced by a forward error correction (FEC) process.

"Band Guarantee of Inter-Server Network"

Next, band guarantee of the inter-server network 500 will be described. A situation will be considered in which, in the AV server system 10 illustrated in FIG. 1, a certain operator operates a client controller 200 (200-1, 200-2, . . . , 200-M) to output the AV clip data to the outside of the system from the corresponding AV server 100 (100-1, 100-2, . . . , 100-N).

The manager 300 has a database of information relevant to the AV clip data stored in all the AV servers 100. This information includes storage ID, clip ID, clip name, start time code, duration, video format/codec, keyword, and the like, for example.

The content of the database of the manager 300 is updated on the basis of a command from the client controller 200. The client controller 200 has a database similar to the manager 300. The manager 300 delivers the updated data to the client controller 200 each time the database of the manager 300 is updated, thereby updating the database in the client controller 200.

The operator recognizes the content of the database on the screen of a monitor (not depicted) connected to the client controller 200, and inputs a command with a keyboard, a mouse, a jog dial, or the like. In this case, when a certain clip is selected from a plurality of clips displayed on the monitor screen, a list of names associated with feature scenes in the clip is displayed. Further, when a certain name is selected from the list of names, thumbnails corresponding to the scene are displayed.

With reference to the display of the monitor screen, the operator inputs, into the client controller 200, a replay request indicating from which scene to which scene of which AV clip is output to which output port of the AV server 100 at which time. Here, the time is on a base axis of time code by the frame rate that the AV server system 10 operationally specifies.

The replay request input into the client controller 200 is transferred to the manager 300. The manager 300 makes a schedule for executing the replay request. That is, the manager 300 arranges a utilization schedule of devices in the AV server 100 that stores the AV clip data, a band utilization schedule of the inter-server network 500, and a utilization schedule of devices in the AV server 100 that has the output port, in order to output a replay output to the designated output port at a requested time. Here, the band utilization schedule and the device utilization schedule are referred to as "band booking" and "device booking" as appropriate, in the following.

The manager 300 confirms the availability of the booking arranged as described above. That is, the manager 300 confirms whether or not a necessary device is available with regard to the AV server 100, and whether or not the band is guaranteed with regard to the inter-server network 500, on the basis of the schedule arranged as described above.

The band of the inter-server network 500 is normally decided by the capability of the IP switch that forms the network. In confirming the band guarantee, the manager 300 confirms whether or not there is a band that can be used in the replay request over all moments during the data transmission period on the inter-server network 500 which is necessary for the replay request. That is, the manager 300 confirms whether or not a predetermined band amount remains, by subtracting the used band of this time from the remainder of the consumed band amount of the inter-server network 500 during the data transmission period of this time, which is scheduled before the replay request of this time.

In a case in which the inter-server network 500 and the controller/server network 600 are integrated without configuring V-LAN, it seems necessary to reduce the band that is used in the communication of the controller/server network 600. However, the data amount of the communication of the controller/server network 600 is far smaller than the data amount of the compressed AV clip data, and can be ignored.

Also, the manager 300 confirms the device availability, similarly to the confirmation of the band guarantee. That is, the manager 300 confirms whether or not the devices corresponding to the replay request of this time is available over all moments during the data transmission period. Here, the devices mean an inter-server network IO, a system external IO, a decoder, and the like.

When confirming the availability of the booking of this time over the existence of the previous booking, the manager 300 sends, to the AV server 100 storing the AV clip of replay target, a command to perform the data transfer to the AV server 100 designated as the external output port, in accordance with the booking. Thereby, data transmission is started from the AV server 100 storing the AV clip of replay target to the AV server 100 designated as the external output port.

Also, when confirming no availability of the booking of this time over the existence of the previous booking, the manager 300 announces a rejection of the replay request to the operator through the client controller 200.

Note that, in the above description, in response to the replay request from the client controller 200, the manager 300 arranges the schedule, and confirms the availability of the schedule, and sends a command to the AV server 100 in accordance with the schedule. However, the client controller 200 has the database updated in a timely manner, similarly to the manager 300 as described above, and thus the client controller 200 can arrange the schedule in response to the replay request and confirm the availability of the schedule by itself.

In that case, for example, the client controller 200 sends the schedule whose availability is confirmed finally, to the AV server 100 designated as the external output port through the manager 300. Then, in accordance with the booking, this AV server 100 sends a command to the AV server 100 storing the AV clip of the replay target, in order to perform data transfer to the AV server 100 designated as the external output port. Thereby, data transmission is started from the AV server 100 storing the AV clip of the replay target to the AV server 100 designated as the external output port.

It is conceived that a data packet is lost in some cases, in the data transmission from the AV server 100 storing the AV clip of the replay target to the AV server 100 designated as the external output port. If such a case is addressed by a retransmission request, the arranged band booking and device booking are destroyed.

If the data transmission proceeds as the booking, the transmission destination server is unable to receive the data that is expected to come. To prepare for that case, in this embodiment, the forward error correction is performed in the data transmission between the AV servers 100, so that the transmission data has sufficient redundancy and a function for reproducing the unreceived part from the received data is achieved.

The IP output units (IP output ports) 105 in FIGS. 2, 4, 5, 6, and 8 have a function for generating the redundancy for the forward error correction, and the IP input units (IP input ports) 106, 106a, 106b have a function for reproducing the data by the forward error correction if the transmitted data lacks its part.

"Playlist Creation"

Figure 10:
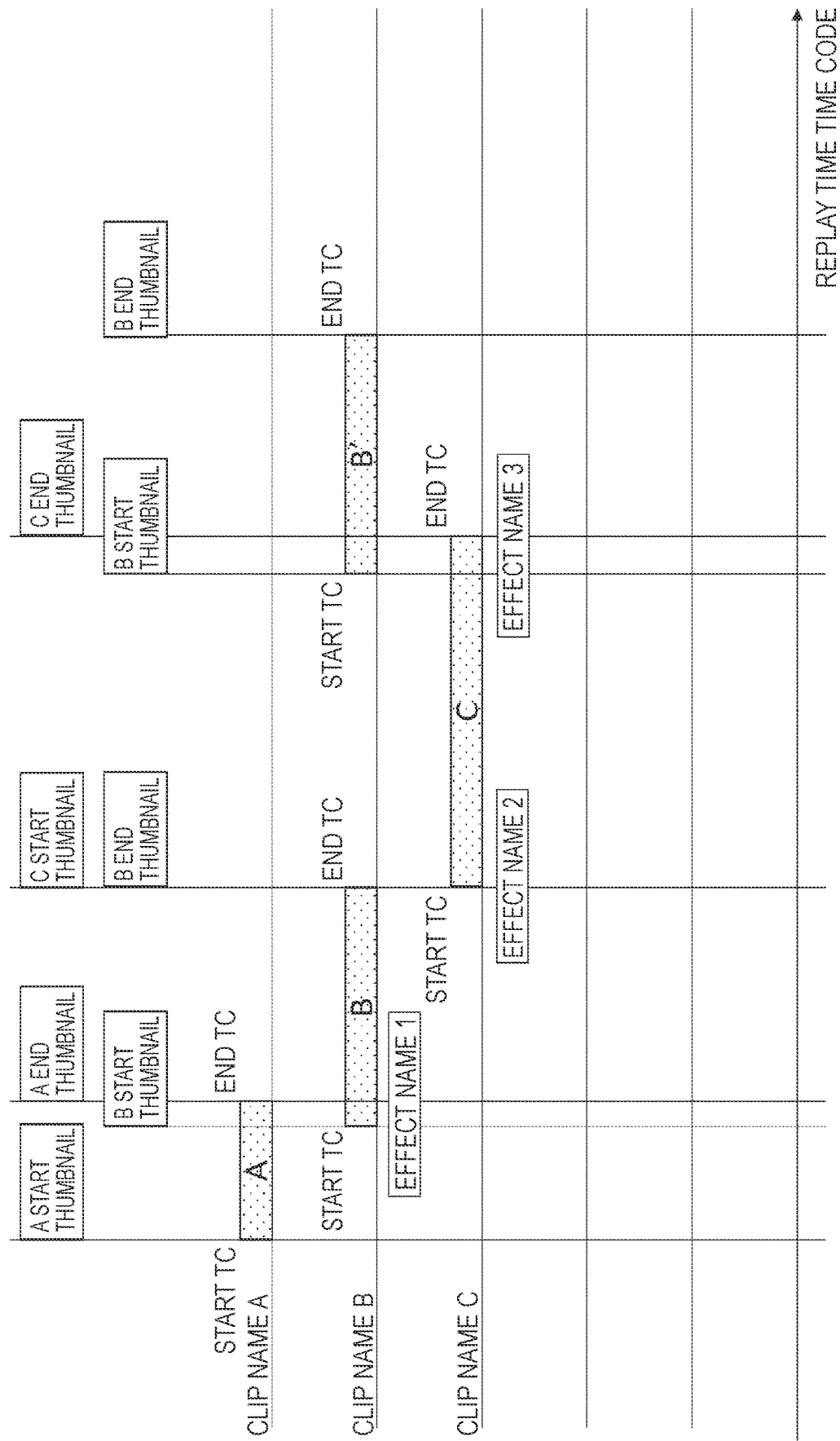
FIG. 10 is a diagram illustrating a playlist creation screen example in a client controller.

FIG. 10 illustrates a playlist creation screen example in the client controller 200. The operator creates a playlist by using the playlist creation screen, on the basis of the clip information displayed in the monitor screen. If a clip to replay is selected along a timeline indicating replay time, and a clip name is input, and a time code of the time to start of the clip is designated as a time code to replay, a screen thumbnail at the start time appears, and if a time code to end is designated, a screen thumbnail at the end time and a display indicating the replay period appear, on the timeline.

For example, in the illustrated example, a rectangle in which "A" is written, a start thumbnail, and an end thumbnail are displayed, with regard to the clip of a clip name A, as illustrated in the drawing. In the illustrated example, the designation of the clip of the clip name A is followed by the designation of the clip of a clip name B, the clip of a clip name C, and the clip of the clip name B. Note that "B'" is written in the rectangle corresponding to the second designation of the clip of the clip name B. In the illustrated example, the playlist defines a replay sequence of A→B→C→B'.

The sections in which the clips overlap temporally indicate that there is an effect during the switching of the screen, and the effect is selected by designating an effect name (in the drawing, indicated by effect names 1, 3). On the other hand, if the clips do not overlap temporally, a simple scene change is performed (in the drawing, indicated by effect name 2).

The playlist is defined in this way in the client controller 200, and its replay is requested to the manager 300. The manager 300 that has received the request makes the band booking and the device booking along the playlist, and confirms the availability. It is also conceived that not the manager 300 but the client controller 200 itself makes the band booking and the device booking for the playlist created as described above, and confirms the availability.

"Change in Direction of Input-Output Port"

Figure 11:
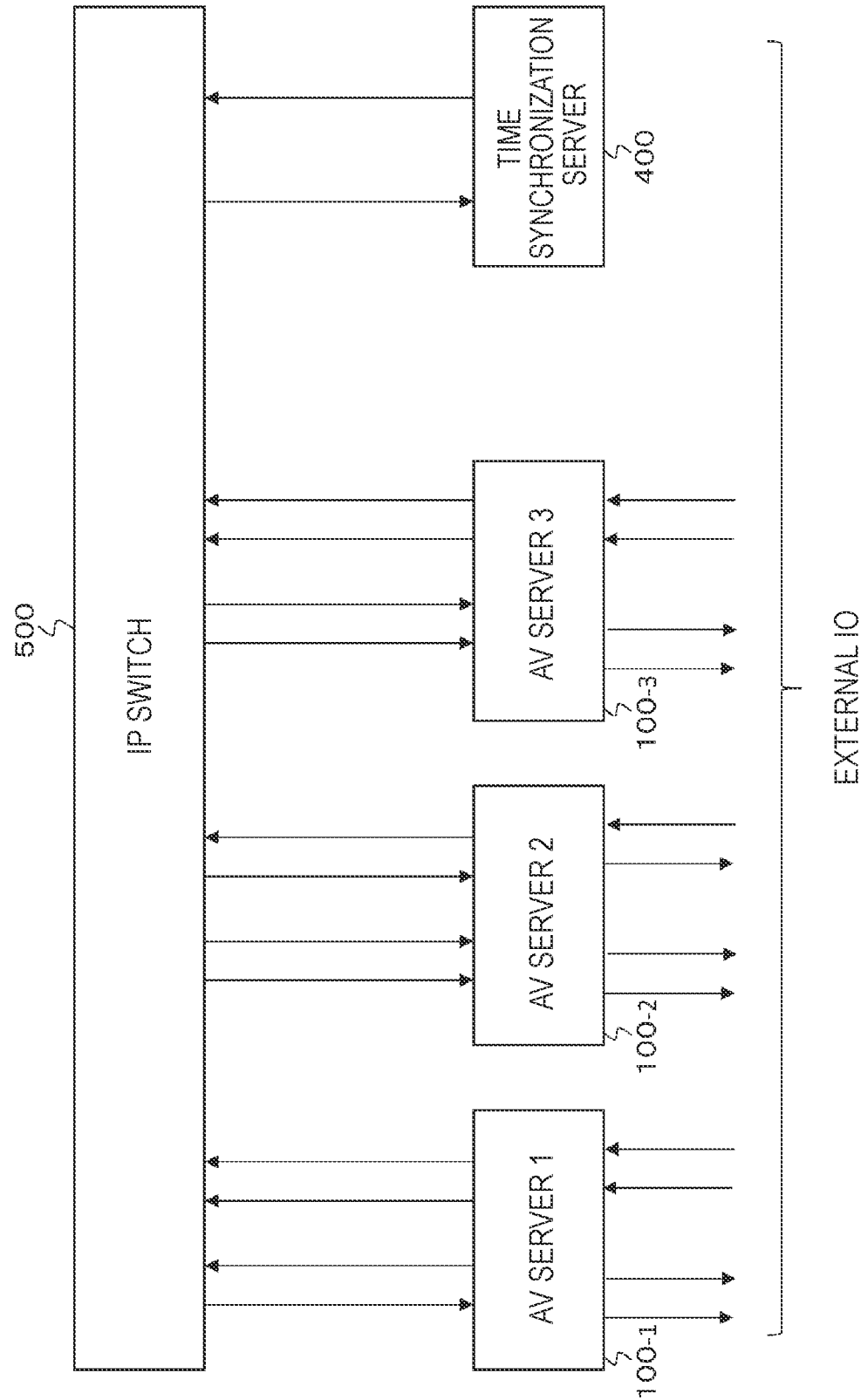
FIG. 11 is a diagram illustrating an example of dynamically changing in/out of an IO port of an AV server.

FIG. 11 illustrates an example in which the devices are made available by inverting in/out dynamically if possible, when there are insufficient IO ports to the inter-server network 500 as the utilized devices. For example, in an initial state, each of three AV servers 100-1, 100-2, 100-3 has two inputs and two outputs as the IO ports to the inter-server network 500.

It is assumed that the replay request of this time is a request for causing the AV clip data stored in the AV server 100-1 to be output to the outside from the AV server 100-2, and during its replay period, two inter-server network output ports from the AV server 100-1 and two inter-server network input ports to the AV server 100-2 have already been booked.

In this case, if one inter-server network input port to the AV server 100-1 and one inter-server network output port from the AV server 100-2 are not booked over the replay request period, the manager 300 sets each port in the inverted direction as illustrated in the drawing, in order to enable execution of the replay request, for example.

Note that inverting an IO port to the outside of the system is also conceived. For example, in the illustrated example, the IO ports to the outside of the system are two inputs and two outputs in an initial state, and one input port of the AV server 100-2 is changed to an output port.

Note that, in the system not in operation, the input-output ports can be combined arbitrarily in the initial state.

"Playlist Replay"

In playlist replay, a replay request itself is the booking of a plurality of replay requests. In addition, the manager 300 performs scheduling for special operation such as scene change by frame break or scene change with effect. Here, a replay request that does not set the end time (end frame) is conceived as the special replay request.

In the band booking and the device booking in this case, the replay possibility is determined in consideration of the schedule of the bands and the devices, under a premise that the bands and the devices are used continuously until the replay end command comes, and if the replay is started, the bands and the devices are booked continuously until the replay end command comes. This applies to a replay request involving a temporally arbitrary command of the operator, such as jog and shuttle.

FIG. 12 illustrates an example of playlist replay. The following device booking and band booking are performed with regard to the playlist to output the AV clip [α] stored in the storage of the AV server 100-1 to the AV server 100-3 from time t2 to time t4, and switch to the AV clip [β] stored in the storage of the AV server 100-2 at time t4, and output the AV clip [β] to time t7, for example.

That is, with regard to the device booking,
the inter-server network output port of the AV server 100-1 is booked from t1 to t5;
the inter-server network output port of the AV server 100-2 is booked from t3 to t7;
one inter-server network output port of the AV server 100-3 is booked from t1 to t5;
one inter-server network output port of the AV server 100-3 is booked from t3 to t7; and
the output port to the outside of the AV server 100-3 is booked from t2 to t7 (in addition, necessary decoders inside the servers, etc. are booked).

Also, with regard to the band booking, the band of the inter-server network 500 for sending the compressed data of each of the AV clip [α] and the AV clip [β] is booked in an appropriate time slot.

If such booking is performed and executed, all devices and bands are made available by t7. However, if jog and shuttle are performed arbitrarily with regard to the replay along this playlist, the above booking of the devices and bands must be continued endlessly. This is because the transmission route and the data position for switching the AV clip are decided, but nothing is decided for the replayed part and the replay end.

This is because the devices and the bands are necessary endlessly to allow arbitrary motion, such as skipping by the shuttle, moving finely by the jog, and returning by the shuttle, as described in the lower portion of FIG. 12, for example.

As described above, in the AV server system 10 illustrated in FIG. 1, a plurality of AV servers 100 are connected by the IP network, and the number of IO ports and the storage amount are increased easily. Also, the inter-server network 500 between the AV servers 100 is configured with general-purpose IP switches, which are not specialized for AV system products, and thus not only acquisition is easy in future, but also the performance is expected to be improved, and a connection that can meet more advanced replay request is enabled.

2. Variant Example

Although the above embodiment has illustrated an example in which the inter-server network 500 and the controller/server network 600 are independent, V-LAN may be formed as the physically same IP network. Also, the network may be physically the same as the IP network outside the system, as long as the independence by V-LAN is maintained.

Also, the above embodiment has illustrated an example in which each of the time synchronization server 400, the manager 300, and the client controllers 200-1, 200-2, . . . , 200-M is provided independently. However, these do not need to exist physically independently, and there may be other functions in the AV servers 100-1, 100-2, . . . , 100-N. For example, the individual AV servers may have a client controller function, and one of the AV servers may have a manager function, and similarly one of the AV servers may serve as a time synchronization server.

Also, the above embodiment has illustrated an example in which there is one manager 300. However, it may be such that a plurality of managers are connected, and normally only one of them is in operation while the others are reserved as backup, and the information sent to the one manager in operation is also sent to the other backup managers to always update the recognized information, and thereby one of the backup managers operates as a new manager when the manager in operation is down.

Additionally, the present technology may also be configured as below.

(1)

An AV server system including:

a plurality of AV servers including internet protocol (IP) input-output ports for connecting to other AV servers, the IP input-output ports being independent from input-output ports to an outside of the system;

a client controller configured to control the plurality of AV servers;

a manager storing information relevant to AV clip data recorded in the plurality of AV servers and AV clip data input into the plurality of AV servers; and a frame synchronization unit configured to perform frame synchronization between the plurality of AV servers.

(2)

The AV server system according to (1), in which the AV server outputs compressed AV clip data of a predetermined number of frames at a predetermined number of frame cycles from the IP input-output port.

(3)

The AV server system according to (1), in which the AV server outputs compressed AV clip data of one frame at one frame cycle from the IP input-output port.

(4)

The AV server system according to (1), in which the AV server processes compressed AV clip data input into the IP input-output port at a predetermined number of frame cycles, as compressed AV clip data of a predetermined number of frames.

(5)

The AV server system according to (1), in which the AV server processes compressed AV clip data input into the IP input-output port at one frame cycle, as compressed AV clip data of one frame.

(6)

The AV server system according to (1), in which the AV server processes compressed AV clip data input into the IP input-output port during a period of one frame or less from a frame start time, as compressed AV clip data of one frame.

(7)

The AV server system according to (6), in which the AV server reproduces deficient compressed AV clip data from the input compressed AV clip data by forward error correction.

(8)

The AV server system according to any one of (1) to (7), in which the AV server outputs compressed AV clip data corresponding to normal video data or compressed AV clip data corresponding to raw data obtained by a single-chip camera, to the IP input-output port.

(9)

The AV server system according to (8), in which metadata for a demosaic process is appended to the compressed AV clip data corresponding to the raw data.

(10)

The AV server system according to any one of (1) to (9), in which the AV server includes a decoding unit configured to perform a decoding process to compressed AV clip data input into the IP input-output port to obtain uncompressed AV clip data, and a delay time in the decoding unit is constant, regardless of a compressed data format of the input compressed AV clip data.

(11)

The AV server system according to any one of (1) to (10), in which the AV server is capable of arbitrarily changing a number of input ports and a number of output ports, among a total number of the IP input-output ports.

(12)

An AV server including:

an internet protocol (IP) input-output port for connecting to another AV server.

(13)

The AV server according to (12), in which the AV server outputs compressed AV clip data of a predetermined number of frames at a predetermined number of frame cycles from the IP input-output port.

(14)

The AV server according to (12), in which the AV server processes compressed AV clip data input into the IP input-output port at a predetermined number of frame cycles, as compressed AV clip data of a predetermined number of frames.

(15)

The AV server according to any one of (12) to (14), in which the AV server outputs compressed AV clip data corresponding to normal video data or compressed AV clip data corresponding to raw data obtained by a single-chip camera, to the IP input-output port.

(16)

The AV server according to any one of (12) to (15), including:

a decoding unit configured to perform a decoding process to compressed AV clip data input into the IP input-output port to obtain uncompressed AV clip data, in which a delay time in the decoding unit is constant, regardless of a compressed data format of the input compressed AV clip data.

(17)

The AV server according to any one of (12) to (16), in which the AV server is capable of arbitrarily changing a number of input ports and a number of output ports, among a total number of the IP input-output ports.

(18)

An AV server system including:

a plurality of AV servers including internet protocol (IP) input-output ports for connecting to other AV servers, the IP input-output ports being independent from input-output ports to an outside of the system;

a client controller configured to control the plurality of AV servers; and a manager storing information relevant to AV clip data recorded in the plurality of AV servers and AV clip data input into the plurality of AV servers, in which the AV server outputs compressed AV clip data of a predetermined number of frames at a predetermined number of frame cycles from the IP input-output port.

(19)

The AV server system according to any one of (1) to (18), in which the AV server includes a first record unit configured to record, in a storage, first AV clip data obtained by performing a compression encoding process to raw data of a high frame rate input from a single-chip camera, with metadata for performing a demosaic process appended.

(20)
The AV server system according to (19), in which
the AV server further includes a second record unit configured to record, in the storage, second AV clip data obtained by converting the raw data of the high frame rate input from the single-chip camera to raw data of a normal frame rate and then performing the demosaic process to obtain normal video data of a normal frame rate, and performing a compression encoding process to the normal video data.

REFERENCE SIGNS LIST

10 AV server system
100, 100-1, 100-2, . . . , 100-N AV server
101 system controller
102 encoder
103 storage
104, 104a, 104b decoder
105 IP output unit (IP output port)
106, 106a, 106b IP input unit (IP input port)
107 frame buffer
108 bank
109 SDI formatter
110 effector
117 addition processing unit
118 demosaic unit
119 encoder
200, 200-1, 200-2, . . . , 200-M client controller
300 manager
400 time synchronization server
500 inter-server network
600 controller/server network

The invention claimed is:
1. An AV server system, comprising:
a plurality of AV servers, wherein
each of the plurality of AV servers includes an internet protocol (IP) input-output port,
a first AV server of the plurality of AV servers is configured to:
connect to a second AV server of the plurality of AV servers via the IP input-output port of the first AV server;
receive first AV clip data that corresponds to raw data, wherein
a first frame rate of the raw data is higher than a second frame rate of normal video data;
convert the first AV clip data having the first frame rate to second AV clip data having the second frame rate, wherein the second AV clip data corresponds to the normal video data;
transmit the second AV clip data to the second AV server;
compress the first AV clip data;
record the compressed first AV clip data; and
output the recorded first AV clip data to the IP input-output port of the first AV server,
the second AV server is configured to:
compress the second AV clip data;
record the compressed second AV clip data; and
output the recorded second AV clip data to the IP input-output port of the second AV server,
the plurality of AV servers is further configured to switch the output of the first AV clip data having the first frame rate to the output of the second AV clip data having the second frame rate, the output of the first AV clip data is switched to the output of the second AV clip data after a fixed time period, and
the IP input-output port of each of the plurality of AV servers is independent from external input-output ports corresponding to the plurality of AV servers;
a client controller configured to control the plurality of AV servers;
a manager configured to store information associated with the recorded first AV clip data and the recorded second AV clip data; and
a frame synchronization unit configured to execute frame synchronization between each of the plurality of AV servers.

2. The AV server system according to claim 1, wherein the first AV server is further configured to output the compressed first AV clip data of a specific number of frames at a specific number of frame cycles, from the IP input-output port of the first AV server.

3. The AV server system according to claim 1, wherein the second AV server is further configured to output the compressed second AV clip data of one frame at one frame cycle, from the IP input-output port of the second AV server.

4. The AV server system according to claim 1, wherein the first AV server is further configured to process the compressed first AV clip data, input into the IP input-output port of the first AV server at a specific number of frame cycles, as the compressed first AV clip data of a specific number of frames.

5. The AV server system according to claim 1, wherein the second AV server is further configured to process the compressed second AV clip data, input into the IP input-output port of the second AV server at one frame cycle, as the compressed second AV clip data of one frame.

6. The AV server system according to claim 1, wherein the second AV server is further configured to process the compressed second AV clip data, input into the IP input-output port of the second AV server in a period of one of one frame or less than one frame from a frame start time, as the compressed second AV clip data of one frame.

7. The AV server system according to claim 6, wherein the second AV server is further configured to reproduce deficient compressed AV clip data from the input compressed first AV clip data by forward error correction.

8. The AV server system according to claim 1, wherein the first AV server is further configured to append metadata for a demosaic process to the compressed first AV clip data.

9. The AV server system according to claim 1, wherein the first AV server includes a decoding unit,
the decoding unit is configured to decode the compressed first AV clip data to obtain uncompressed AV clip data, and
a delay time in the decoding unit is constant, regardless of a compressed data format of the compressed first AV clip data.

10. The AV server system according to claim 1, wherein the first AV server includes a first record unit configured to record, in a storage, the first AV clip data, and
the first AV server is further configured to:
compress the first AV clip data based on an encoding process on the raw data of the first frame rate; and
append metadata for a demosaic process to the compressed first AV clip data.

11. The AV server system according to claim 10, wherein the second AV server further includes a second record unit configured to record, in the storage, the second AV clip data, and the first AV server is further configured to
  convert the raw data of the first frame rate input from a single-chip camera to raw data of the second frame rate;
  apply the demosaic process on the raw data of the second frame rate to obtain the normal video data of the second frame rate; and
  compress the normal video data.

12. The AV server system according to claim 1, wherein the first AV server is further configured to apply a demosaic process on the raw data to obtain the normal video data.

13. A first AV server, comprising:
an internet protocol (IP) input-output port, wherein the first AV server is configured to:
  connect to a second AV server via the IP input-output port;
  receive first AV clip data that corresponds to raw data, wherein
    a first frame rate of the raw data is higher than a second frame rate of normal video data;
  convert the first AV clip data having the first frame rate to second AV clip data having the second frame rate, wherein the second AV clip data corresponds to the normal video data;
  transmit the second AV clip data to the second AV server;
  compress the first AV clip data;
  record the compressed first AV clip data; and
  output the recorded first AV clip data to the IP input-output port of the first AV server, wherein
  the second AV server:
    compresses the second AV clip data;
    records the compressed second AV clip data; and
    outputs the recorded second AV clip data to an IP input-output port of the second AV server,
  a plurality of AV servers switches the output of the first AV clip data having the first frame rate to the output of the second AV clip data having the second frame rate,
  the output of the first AV clip data is switched to the output of the second AV clip data after a fixed time period, and
  the plurality of AV servers includes the first AV server and the second AV server.

14. The first AV server according to claim 13, wherein the first AV server is further configured to output the compressed first AV clip data of a specific number of frames at a specific number of frame cycles, from the IP input-output port of the first AV server.

15. The first AV server according to claim 13, wherein the first AV server is further configured to process the compressed first AV clip data, input into the IP input-output port of the first AV server at a specific number of frame cycles, as the compressed first AV clip data of a specific number of frames.

16. The first AV server according to claim 13, further comprising a decoding unit configured to decode the compressed first AV clip data to obtain uncompressed AV clip data, wherein a delay time in the decoding unit is constant, regardless of a compressed data format of the compressed first AV clip data.

17. An AV server system, comprising:
a plurality of AV servers, wherein
  each of the plurality of AV servers includes an internet protocol (IP) input-output port,
  a first AV server of the plurality of AV servers is configured to:
    connect to a second AV server of the plurality of AV servers via the IP input-output port of the first AV server;
    receive first AV clip data that corresponds to raw data, wherein
      a first frame rate of the raw data is higher than a second frame rate of normal video data;
    convert the first AV clip data having the first frame rate to second AV clip data having the second frame rate, wherein the second AV clip data corresponds to the normal video data;
    transmit the second AV clip data to the second AV server;
    compress the first AV clip data;
    record the compressed first AV clip data; and
    output the recorded first AV clip data of a first number of frames at a first number of frame cycles, from the IP input-output port of the first AV server,
  the second AV server is configured to:
    compress the second AV clip data;
    record the compressed second AV clip data; and
    output the recorded second AV clip data of a second number of frames at a second number of frame cycles, from the IP input-output port of the second AV server,
  the plurality of AV servers is further configured to switch the output of the first AV clip data having the first frame rate to the output of the second AV clip data having the second frame rate,
  the output of the first AV clip data is switched to the output of the second AV clip data after a fixed time period, and
  the IP input-output port of each of the plurality of AV servers is independent from external input-output ports corresponding to the plurality of AV servers;
a client controller configured to control the plurality of AV servers; and
a manager configured to store information associated with the recorded first AV clip data and the recorded second AV clip data.

\* \* \* \* \*